(12) United States Patent
Takegawa et al.

(10) Patent No.: US 10,173,530 B2
(45) Date of Patent: Jan. 8, 2019

(54) POWER CONVERSION SYSTEM

(71) Applicant: Mitsubishi Electric Corporation, Tokyo (JP)

(72) Inventors: Kazuki Takegawa, Tokyo (JP); Koji Nakajima, Tokyo (JP); Satoshi Ishibashi, Tokyo (JP); Kazuhiko Otsuka, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/728,691

(22) Filed: Oct. 10, 2017

(65) Prior Publication Data

US 2018/0178656 A1  Jun. 28, 2018

(30) Foreign Application Priority Data

Dec. 26, 2016 (JP) ................. 2016-250446

(51) Int. Cl.
*H02P 27/04* (2016.01)
*B60L 3/04* (2006.01)
*B60L 3/00* (2006.01)
*H02P 6/24* (2006.01)

(52) U.S. Cl.
CPC ............ *B60L 3/04* (2013.01); *B60L 3/0007* (2013.01); *H02P 6/24* (2013.01); *B60L 2240/421* (2013.01); *B60L 2240/425* (2013.01)

(58) Field of Classification Search
CPC ...... H02P 1/00; H02P 3/00; H02P 6/00; H02P 6/002; H02P 6/006; H02P 6/008; H02P 6/04; H02P 6/06; H02P 6/08; H02P 7/2805; H02P 7/2815; H02P 7/2855; H02P 7/2913; H02P 7/2985; H02P 7/305; H02P 21/00; H02P 21/0035; H02P 23/00; H02P 25/145; H02P 27/00; H02P 27/045; H02P 27/04; H02P 27/06; H02P 2005/401;
(Continued)

(56) References Cited

U.S. PATENT DOCUMENTS 8,786,238 B2 * 7/2014 Oyobe ............... H02P 3/22
307/10.1

FOREIGN PATENT DOCUMENTS

JP  2015-144518 A  8/2015
JP  2016-111754 A  6/2016
(Continued)

*Primary Examiner* — Antony M Paul
(74) *Attorney, Agent, or Firm* — Sughrue Mion, PLLC; Richard C. Turner (57) ABSTRACT

When a motor rotation speed is equal to or greater than a predetermined rotation speed when an automobile collision is detected or when power stops, a motor rotation speed reduction control is carried out by an inverter control unit, and when an inter-terminal voltage of a secondary smoothing capacitor drops below a predetermined voltage during the motor rotation speed reduction control, the motor rotation speed reduction control is stopped, whereby induction voltage caused by motor rotation is applied to the secondary smoothing capacitor, the inter-terminal voltage of the secondary smoothing capacitor is raised, and the motor rotation speed reduction control is carried out while keeping the inter-terminal voltage of the secondary smoothing capacitor within an operating voltage range of the inverter control unit.

5 Claims, 3 Drawing Sheets

(58) Field of Classification Search
CPC ....... H02P 2005/418; H02P 2007/6204; H02P 2201/09; H02P 2201/07; H02P 41/00; H02P 41/02
See application file for complete search history.

(56) References Cited

FOREIGN PATENT DOCUMENTS

| | | |
|---|---|---|
| JP | 2016-111755 A | 6/2016 |
| WO | 2016/136815 A1 | 9/2016 |

* cited by examiner

POWER CONVERSION SYSTEM

BACKGROUND OF THE INVENTION

Field of the Invention

The present invention relates to a power conversion system mounted in a vehicle such as a hybrid automobile, and in particular, relates to a power conversion system that carries out motor rotation speed reduction control in accordance with vehicle information when a vehicle collision is detected or when power stops.

Description of the Related Art

There is an existing hybrid automobile that includes a rechargeable direct current power supply, a step-up converter that steps up a direct current voltage supplied from the direct current power supply, a primary smoothing capacitor that smooths voltage between the direct current power supply and step-up converter, an inverter that converts high direct current voltage output from the step-up converter into alternating current voltage, a secondary smoothing capacitor that smooths voltage between the step-up converter and inverter, and a 3-phase alternating current motor by which driving force and braking force of the vehicle are controlled by alternating current voltage output from the inverter being applied.

This kind of hybrid automobile is such that, in order to secure vehicle safety, it is necessary to swiftly release a high voltage charge accumulated in a smoothing capacitor, thereby preventing electrocution, when the vehicle collides or when power stops. When the motor is rotating in this case, the voltage of the secondary smoothing capacitor rises due to induction voltage from the motor, because of which a discharge time increases.

Therefore, a method of reducing motor rotation speed after a vehicle collision in order to restrict a voltage rise due to induction voltage from the motor is proposed in, for example, Patent Document 1, Patent Document 2, and Patent Document 3.

Also, a method of releasing a charge accumulated in a secondary smoothing capacitor by power being supplied to an inverter control circuit from inter-terminal voltage of the secondary smoothing capacitor, even when a power supply for driving the inverter control circuit is interrupted, is proposed in, for example, Patent Document 4.
Patent Document 1: JP-A-2016-111754
Patent Document 2: JP-A-2016-111755
Patent Document 3: WO 2016/136815
Patent Document 4: JP-A-2015-144518

However, the method proposed in Patent Documents 1 and 2 and Patent Document 3 is such that there is concern about losing a power supply for driving an inverter control circuit when reducing the motor rotation speed. Also, the method proposed in Patent Document 4 is such that no consideration is given to whether or not the voltage between the terminals of the smoothing capacitor supplied in order to drive the inverter control circuit can drive the inverter control circuit.

SUMMARY OF THE INVENTION

The invention, having been contrived with consideration to the heretofore described kinds of existing problem, has an object of providing a power conversion system such that a high voltage charge accumulated in a secondary smoothing capacitor can be swiftly released, without losing a power supply that drives an inverter control unit, while controlling motor speed reduction after a vehicle collision or after power is stopped.

In order to achieve the heretofore described object, a power conversion system according to the invention is characterized by including a direct current power supply, a step-up converter that steps up direct current voltage supplied from the direct current power supply, an inverter that converts direct current voltage output from the step-up converter into alternating current voltage, a capacitor that smooths inter-terminal voltage between the step-up converter and inverter, an inverter controller supplied with power by inter-terminal voltage of the capacitor, inter-terminal voltage detecting means that detects the inter-terminal voltage of the capacitor, a motor linked to an axle driven by the inverter, motor rotation speed detecting means that detects a rotation speed of the motor, and a discharge determination indicator that outputs an instruction to release a charge accumulated in the capacitor, wherein execution of a discharge operation is instructed by the discharge determination indicator, a motor rotation speed reduction control that reduces the rotation speed of the motor is carried out by the inverter controller when the rotation speed of the motor is equal to or greater than a preset threshold, and when inter-terminal voltage obtained from the inter-terminal voltage detecting means drops below a preset threshold during execution of the motor rotation speed reduction control, the motor rotation speed reduction control is stopped, whereby induction voltage caused by motor rotation is applied to the capacitor, and the inter-terminal voltage of the capacitor is raised.

According to the power conversion system according to the invention, a high voltage charge accumulated in a smoothing capacitor can be swiftly released after reduction of a motor rotation speed, without losing a power supply that drives an inverter control unit, using the heretofore described configuration.

The foregoing and other objects, features, aspects and advantages of the invention will become more apparent from the following detailed description of the invention when taken in conjunction with the accompanying drawings.

DETAILED DESCRIPTION OF THE PREFERRED EMBODIMENTS

Hereafter, using the drawings, an embodiment of a power conversion system according to the invention will be described. In the embodiment, a case in which the power conversion system is mounted in a hybrid automobile will be described, but the power conversion system may also be mounted in a vehicle other than a hybrid automobile.

First Embodiment

Figure 1:
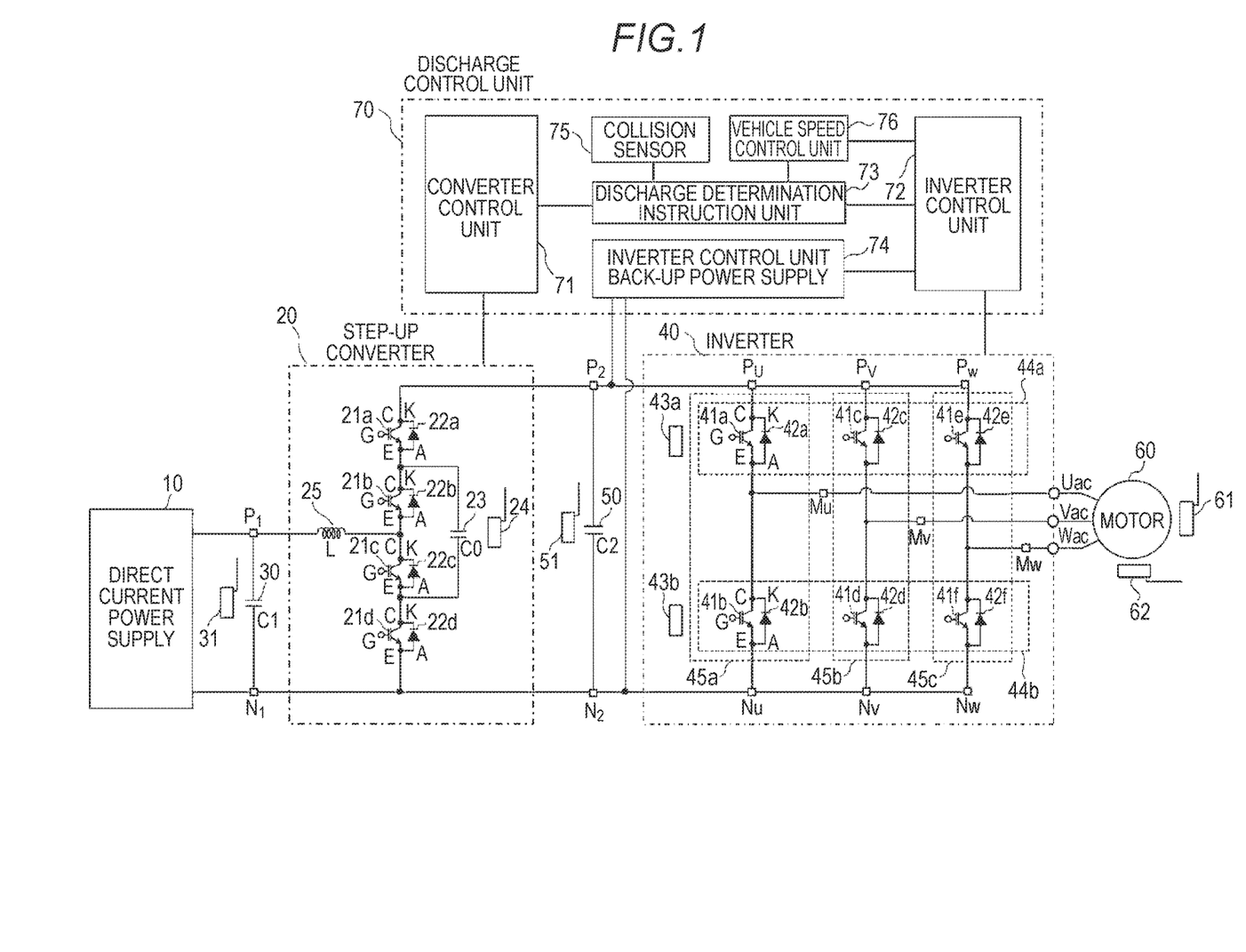
FIG. 1 is a configuration diagram showing a power conversion system according to a first embodiment of the invention.

FIG. 1 is a configuration diagram showing a power conversion system according to a first embodiment of the invention.

As shown in FIG. 1, the power conversion system according to the first embodiment of the invention includes a direct current power supply 10, a step-up converter 20, a primary smoothing capacitor 30, a primary voltage sensor 31, which is means of detecting inter-terminal voltage of the primary smoothing capacitor 30, an inverter 40, a secondary smoothing capacitor 50, a secondary voltage sensor 51, which is means of detecting inter-terminal voltage of the secondary smoothing capacitor 50, a 3-phase alternating current motor 60, a motor rotation speed sensor 61, which is means of detecting a rotation speed of the 3-phase alternating current motor 60, a motor temperature sensor 62, and a discharge control unit 70.

The direct current power supply 10 is rechargeable, and carries out an exchange of power with the 3-phase alternating current motor 60 via the inverter 40. The step-up converter 20 is provided between the direct current power supply 10 and inverter 40, and steps up direct current voltage supplied from the direct current power supply 10 using DC/DC conversion. The primary smoothing capacitor 30 is connected between the direct current power supply 10 and step-up converter 20, and smooths voltage between the direct current power supply 10 and step-up converter 20. Also, the primary voltage sensor 31 measures voltage between a high voltage side node and low voltage side node of the primary smoothing capacitor 30.

The inverter 40 converts high direct current voltage output from the step-up converter 20 into alternating current voltage using DC/DC conversion. The secondary smoothing capacitor 50 is connected between the step-up converter 20 and inverter 40, and smooths voltage between the step-up converter 20 and inverter 40. Also, the secondary voltage sensor 51 measures voltage between a high voltage side node and low voltage side node of the secondary smoothing capacitor 50.

The 3-phase alternating current motor 60 controls driving force and braking force of a vehicle by alternating current voltage output from the inverter 40 being applied. The motor rotation speed sensor 61 measures the rotation speed of the 3-phase alternating current motor 60. The motor temperature sensor 62 measures a temperature of the 3-phase alternating current motor 60.

The discharge control unit 70 includes a converter control unit 71, an inverter control unit 72, a discharge determination instruction unit 73, and an inverter control unit back-up power supply 74. The discharge determination instruction unit 73 outputs an instruction to the inverter control unit 72 to release a charge accumulated in the secondary smoothing capacitor 50 when a vehicle collision is detected by a collision sensor 75, or when power is switched to a stopped state by a vehicle speed control unit 76. Also, the discharge determination instruction unit 73 may, at the same time, output an instruction to the converter control unit 71 to release charges accumulated in the primary smoothing capacitor 30 and in an energy shifting capacitor 23 inside the step-up converter 20. The inverter control unit back-up power supply 74 is a back-up power supply temporarily used when a normally used power supply falls into an unusable state, and is a power supply that has a charge accumulated in the secondary smoothing capacitor 50 as a power supply source.

The converter control unit 71 controls switching operations of semiconductor switching elements 21a to 21d, which are components of power semiconductor elements included in the step-up converter 20, thereby carrying out DC/DC conversion in the step-up converter 20. The inverter control unit 72 controls switching operations of semiconductor switching elements 41a to 41f of upper arm side power semiconductor elements 44a and lower arm side power semiconductor elements 44b of switching arms included in the inverter 40, thereby carrying out DC/AC conversion in the inverter 40.

A power semiconductor element in the step-up converter 20 and inverter 40 has as a unit a semiconductor switching element and semiconductor rectifying element connected to each other in anti-parallel. Also, a serially connected body of power semiconductor elements is called an arm.

Herein, a detailed configuration of the inverter 40 will be described. Arms of the inverter 40 are provided in a quantity corresponding to a number of phases of the 3-phase alternating current motor 60 to be driven, and as shown in FIG. 1, the inverter 40 is configured of three switching arms 45a to 45c of a U-phase, V-phase, and W-phase.

The U-phase switching arm 45a of the inverter 40 uses insulated gate bipolar transistors (IGBTs) having, for example, Si as a material as the semiconductor switching elements 41a and 41b, and uses PIN diodes having the same Si as a material as semiconductor rectifying elements 42a and 42b. Also, another material may be used.

A cathode electrode K of the semiconductor rectifying element 42a is connected to a collector electrode C of the semiconductor switching element 41a, and an anode electrode A of the semiconductor rectifying element 42a is connected to an emitter electrode E of the semiconductor switching element 41a, whereby the semiconductor switching element 41a and semiconductor rectifying element 42a are connected to each other in anti-parallel, forming a power semiconductor element unit. Also, in the same way, the cathode electrode K of the semiconductor rectifying element 42b is connected to the collector electrode C of the semiconductor switching element 41b, and the anode electrode A of the semiconductor rectifying element 42b is connected to the emitter electrode E of the semiconductor switching element 41b. In this way, the U-phase switching arm 45a of the inverter 40 is configured by a power semiconductor element formed of the semiconductor switching element 41a and semiconductor rectifying element 42a and a power semiconductor element formed of the semiconductor switching element 41b and semiconductor rectifying element 42b being connected in series.

The V-phase switching arm 45b and W-phase switching arm 45c of the inverter 40 are configured in the same way as the U-phase switching arm 45a, with the V-phase switching arm 45b being configured by a power semiconductor element formed of the semiconductor switching element 41c and a semiconductor rectifying element 42c and a power semiconductor element formed of the semiconductor switching element 41d and a semiconductor rectifying element 42d being connected in series, and the W-phase switching arm 45c being configured by a power semiconductor element formed of the semiconductor switching element 41e and a semiconductor rectifying element 42e and a power semiconductor element formed of the semiconductor switching element 41f and a semiconductor rectifying element 42f being connected in series.

Also, the inverter control unit 72 controls switching operations of the semiconductor switching elements included in the upper arm side power semiconductor elements 44a and lower arm side power semiconductor elements 44b of the switching arms 45a to 45c included in the inverter 40, thereby controlling an amount of current flowing into the 3-phase alternating current motor 60 by regulating potentials of nodes Uac, Vac, and Wac connected to the 3-phase alternating current motor 60.

As a result of this, the 3-phase alternating current motor 60 controls the driving force and braking force of the vehicle. Also, the inverter control unit 72 acquires rotation information of the 3-phase alternating current motor 60 from the motor rotation speed sensor 61, and acquires temperature information of the 3-phase alternating current motor 60 from the motor temperature sensor 62.

Continuing, a detailed configuration of the step-up converter 20 will be described. The step-up converter 20 includes an arm in which four power semiconductor elements are connected in series.

As shown in FIG. 1, the arm of the step-up converter 20 uses IGBTs having Si as a material as the semiconductor switching elements 21a, 21b, 21c, and 21d, and uses PIN diodes having the same Si as a material as semiconductor rectifying elements 22a, 22b, 22c, and 22d.

The cathode electrode K of the semiconductor rectifying element 22a is connected to the collector electrode C of the semiconductor switching element 21a, and the anode electrode A of the semiconductor rectifying element 22a is connected to the emitter electrode E of the semiconductor switching element 21a, whereby the semiconductor switching element 21a and semiconductor rectifying element 22a are connected to each other in anti-parallel, forming a power semiconductor element unit. Also, in the same way as the connection of the semiconductor switching element 21a and semiconductor rectifying element 22a, the semiconductor switching element 21b and semiconductor rectifying element 22b, the semiconductor switching element 21c and semiconductor rectifying element 22c, and the semiconductor switching element 21d and semiconductor rectifying element 22d are also connected, forming power semiconductor element units. Herein, the emitter electrode E of the semiconductor switching element 21d is connected to a low voltage side node N1 of the primary smoothing capacitor 30, and connected to a low voltage side node N2 of the secondary smoothing capacitor 50. Also, the low voltage side node N2 is connected to nodes Nu, Nv, and Nw of the lower arm side power semiconductor elements 44b of the inverter 40.

Consequently, a low voltage side output terminal of the direct current power supply 10, the low voltage side nodes N1 and N2, and the nodes Nu, Nv, and Nw of the lower arm side power semiconductor elements 44b of the inverter 40, are all of the same potential (represented by a potential Vn).

Also, the collector electrode C of the semiconductor switching element 21d is connected to the emitter electrode E of the semiconductor switching element 21c and a low voltage side node of the energy shifting capacitor 23. The collector electrode C of the semiconductor switching element 21c is connected to the emitter electrode E of the semiconductor switching element 21b and one end of a coil of a reactor 25. Also, the collector electrode C of the semiconductor switching element 21b is connected to the emitter electrode E of the semiconductor switching element 21a and a high voltage side node of the energy shifting capacitor 23. Also, an energy shifting voltage sensor 24 that measures voltage of the energy shifting capacitor 23 is provided in a vicinity of the energy shifting capacitor 23.

Meanwhile, the collector electrode C of the semiconductor switching element 21a is connected to a high voltage side node P2 of the secondary smoothing capacitor 50. Also, the high voltage side node P2 is connected to nodes Pu, Pv, and Pw of the upper arm side power semiconductor elements 44a of the inverter 40. Consequently, the high voltage side node P2, and the nodes Pu, Pv, and Pw of the upper arm side power semiconductor elements 44a of the inverter 40, are all of the same potential (represented by a potential Vp).

Next, a description will be given of an operation of the power conversion device when there is a vehicle collision or when power is stopped.

Firstly, when a vehicle collision is detected by the collision sensor 75, or when use of the vehicle is ended and power switched to a stopped state by the vehicle speed control unit 76, the discharge control unit 70 causes the vehicle to stop safely.

Continuing, the supply of power from the direct current power supply 10 is stopped, and the discharge determination instruction unit 73 instructs the inverter control unit 72 to execute a discharge operation. In accordance with the instruction to execute a discharge operation from the discharge determination instruction unit 73, the inverter control unit 72 firstly controls so that all the semiconductor switching elements of the inverter 40 are switched to an off (open) state, and acquires rotation information from the motor rotation speed sensor 61.

Herein, when the rotation information from the motor rotation speed sensor 61 indicates that the 3-phase alternating current motor 60 is rotating despite the heretofore described control being carried out, there is a possibility that the 3-phase alternating current motor 60 is continuing to rotate due to an external factor, such as a driving wheel (not shown) of the vehicle spinning in a state elevated from a road surface, or the vehicle not being completely stopped even after a collision.

In this kind of case, counter electromotive force is generated in the 3-phase alternating current motor 60, and current flows into the power semiconductor elements of the inverter 40, because of which there is concern that a charge will be accumulated in the secondary smoothing capacitor 50, which should by rights be discharged. Therefore, when there is a state in which the 3-phase alternating current motor 60 rotates and counter electromotive force is generated, it is desirable that the rotation speed of the 3-phase alternating current motor 60 is swiftly reduced, and discharge control carried out so that no charge accumulates in the secondary smoothing capacitor 50, even when the vehicle collides, and some kind of passenger rescue operation or post-accident vehicle disposal should be carried out.

Furthermore, as there is a case in which the supply of power stops when there is a collision, the inverter control unit back-up power supply 74 is used. As the inverter control unit back-up power supply 74 is a power supply that has a charge accumulated in the secondary smoothing capacitor 50 as a power supply source, it is desirable that a difference between the potentials of the high voltage side node P2 and low voltage side node N2 of the secondary smoothing capacitor 50 is controlled to be equal to or greater than a voltage at which the inverter control unit 72 can operate, and equal to or less than a voltage such that there is no danger of electrocution. Also, in order to improve safety performance, it is desirable that the discharge control is also implemented when the vehicle is stopped normally.

Figure 2:
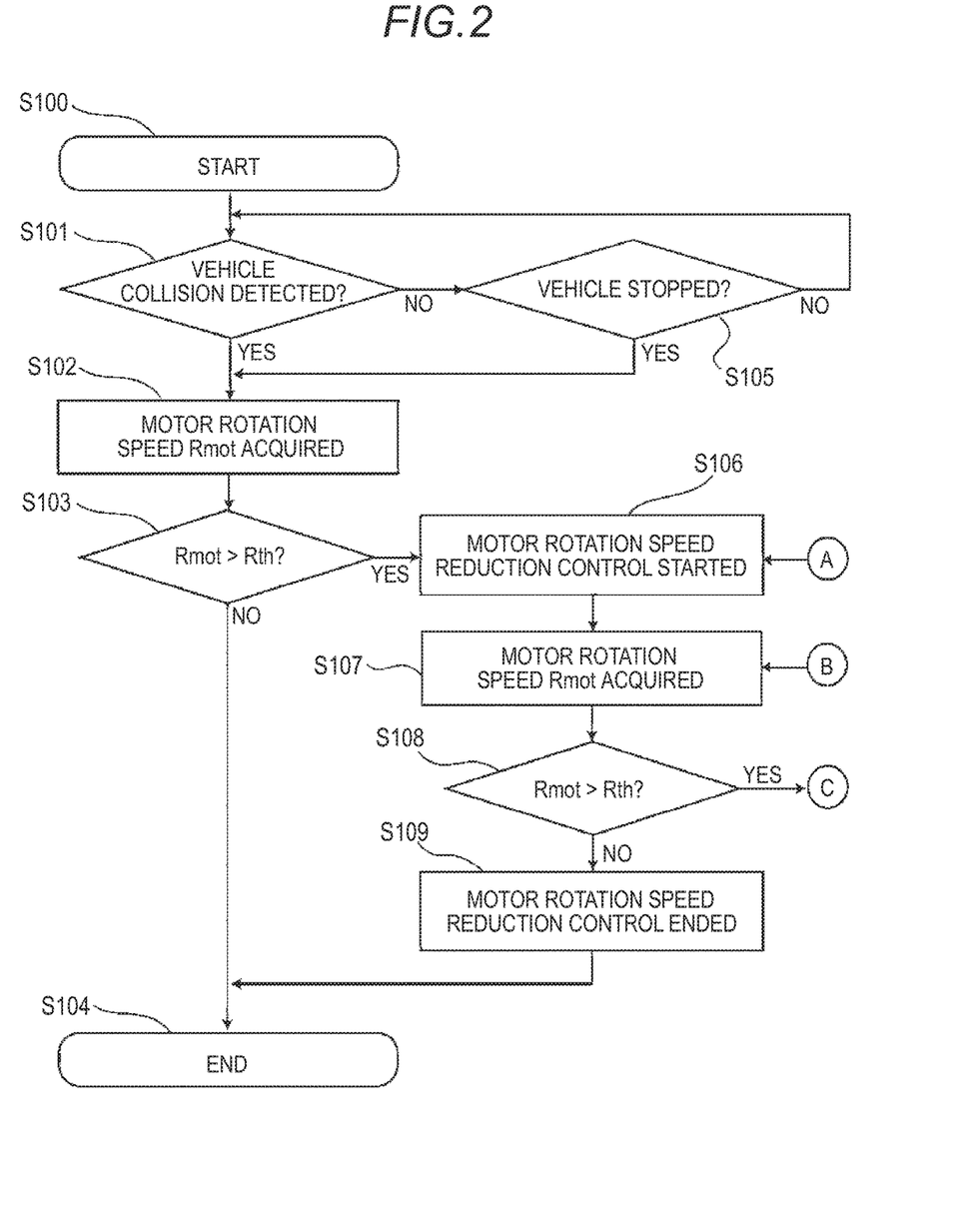
FIG. 2 is a flowchart showing a discharge operation of a discharge control device of the power conversion system according to the first embodiment of the invention.
Figure 3:
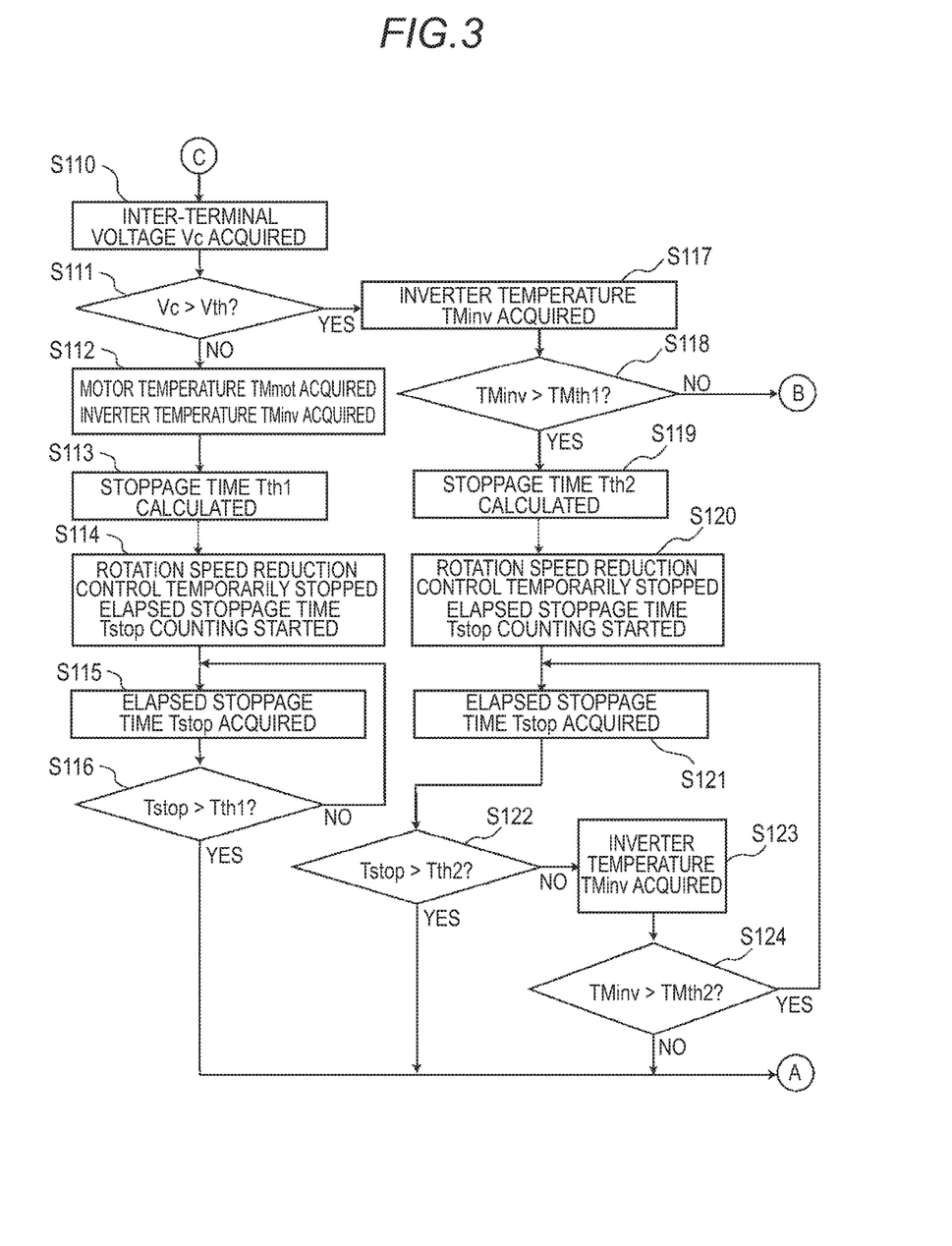
FIG. 3 is a flowchart showing a discharge operation of the discharge control device of the power conversion system according to the first embodiment of the invention.

Hereafter, while referring to flowcharts shown in FIGS. 2 and 3, a description will be given of an operation by the inverter control unit 72 of releasing a charge of the secondary smoothing capacitor 50.

Firstly, after a start (step S100), the discharge determination instruction unit 73, in step S101, acquires vehicle collision detection information from the collision sensor 75 (for example, an acceleration sensor), and outputs a discharge instruction to the inverter control unit 72 when a vehicle collision is detected, whereupon the operation shifts to step S102. When no vehicle collision is detected, the operation shifts to step S105.

In step S105, the discharge determination instruction unit 73 acquires vehicle speed information from the vehicle speed control unit 76, and outputs a discharge instruction to the inverter control unit 72 when a vehicle stop is detected, whereupon the operation shifts to step S102. When no vehicle stop is detected, the operation shifts to step S101, and the heretofore described operation is repeated.

Rotation speed information Rmot is acquired from the motor rotation speed sensor 61 in step S102, and the operation shifts to step S103.

In step S103, the rotation speed information Rmot obtained in step S102 and a predetermined threshold Rth set in advance are compared. The predetermined threshold Rth is a setting value that determines whether or not there is a need to reduce the rotation speed of the 3-phase alternating current motor 60, and when it is determined that Rmot>Rth, discharge control is started, and the operation shifts to step S106. Meanwhile, when it is not determined that Rmot>Rth, the control is ended.

In step S106, motor rotation speed reduction control is started. Motor rotation speed reduction control is discharge control carried out by restricting the rotation speed of the 3-phase alternating current motor 60. Generally, motor rotation speed reduction control is carried out by all the upper arm side power semiconductor elements 44a being switched to an off state, and at the same time, all the lower arm side power semiconductor elements 44b being switched to an on state.

The rotation speed Rmot when the motor rotation speed reduction control is being implemented is acquired from the motor rotation speed sensor 61 in step S107, and the operation shifts to step S108.

In step S108, the rotation speed information Rmot obtained in step S107 and the predetermined threshold Rth set in advance are compared. When it is determined that Rmot>Rth, the motor rotation speed reduction control is continued, and the operation shifts to step S110. Meanwhile, when it is not determined that Rmot>Rth, the operation shifts to step S109, and the motor rotation speed reduction control is ended. The thresholds Rth compared in step S103 and step S108 may be the same setting value, or may be differing setting values.

Inter-terminal voltage information Vc of the secondary smoothing capacitor 50 is acquired from the secondary voltage sensor 51 in step S110, and the operation shifts to step S111.

In step S111, the voltage Vc obtained in step S110 and a predetermined threshold Vth set in advance are compared. When it is determined that Vc>Vth, the motor rotation speed reduction control is continued, and the operation shifts to step S117. Meanwhile, when it is not determined that Vc>Vth, it is determined that the power supply voltage for causing the inverter control unit 72 to operate has dropped, the operation shifts to step S112, and passes through step S113, to be described hereafter, and the motor rotation speed reduction control is temporarily stopped in S114. Because of this, a high voltage charge accumulated in the secondary smoothing capacitor 50 can be swiftly released, without losing the power supply for driving the inverter control unit 72.

Temperature information TMmot of the 3-phase alternating current motor 60 is acquired from the motor temperature sensor 62, and temperature information TMinv of the inverter 40 is acquired from inverter temperature sensors 43a and 43b, in step S112, and the operation shifts to step S113. The inverter temperature sensors 43a and 43b acquire temperature information of the semiconductor switching elements 41a to 41f of the inverter 40, wherein temperature information can be detected by at least one temperature sensor being disposed in a vicinity of any one of the semiconductor switching elements.

A stoppage time Tth1 for which the motor rotation speed reduction control is to be temporarily stopped is calculated in step S113, and the operation shifts to step S114. A method of calculating the stoppage time uses, for example, the following kind of equation. Tth1=a×TMmot+b×Rmot+c×TMinv (a, b, and c are influence coefficients of each parameter).

In step S114, the motor rotation speed reduction control is temporarily stopped, and counting of elapsed stoppage time starts. Because of this, the discharge of the secondary smoothing capacitor 50 is stopped, an accumulation of charge in the secondary smoothing capacitor 50 is started again by the counter electromotive force of the 3-phase alternating current motor 60, and the difference between the potentials of the high voltage side node P2 and low voltage side node N2 increases.

An elapsed stoppage time Tstop is acquired in step S115, and the operation shifts to step S116.

In step S116, the elapsed stoppage time Tstop obtained in step S115 and the stoppage time Tth1 calculated in step S113 are compared. When it is determined that Tstop>Tth1, the motor rotation speed reduction control is restarted, and the operation shifts to step S106. Meanwhile, when it is not determined that Tstop>Tth1, the temporary stoppage of the motor rotation speed reduction control is continued, and the operation shifts to step S115.

Meanwhile, as the semiconductor switching elements 41a to 41f of the inverter 40 are switched during the motor rotation speed reduction control, there is a possibility of the temperatures of the semiconductor switching elements 41a to 41f rising, resulting in breakage. In response to this, control from step S117 is carried out.

Temperature information TMinv of the inverter 40 is acquired from the inverter temperature sensors 43a and 43b in step S117, and the operation shifts to step S118.

In step S118, the temperature information TMinv of the inverter 40 obtained in step S117 and a predetermined threshold TMth1 set in advance are compared. When it is determined that TMinv>TMth1, it is determined that there is a possibility of the temperatures of the semiconductor switching elements 41a to 41f rising, resulting in breakage of the semiconductor switching elements 41a to 41f, the operation shifts to step S119, and the motor rotation speed reduction control is temporarily stopped. Meanwhile, when it is not determined that TMinv>TMth1, the temperatures of the semiconductor switching elements 41a to 41f are appropriate, the motor rotation speed reduction control is continued, and the operation shifts to step S107.

A stoppage time Tth2 for which the motor rotation speed reduction control is to be temporarily stopped is calculated in step S119, and the operation shifts to step S120. A method of calculating the stoppage time uses, for example, the following kind of equation. Tth2=d×TMinv (d is a parameter influence coefficient).

In step S120, the motor rotation speed reduction control is temporarily stopped, and counting of elapsed stoppage time starts. Because of this, the switching of the semiconductor switching elements 41a to 41f is stopped, and the temperatures of the semiconductor switching elements 41a to 41f drop.

The elapsed stoppage time Tstop is acquired in step S121, and the operation shifts to step S122.

In step S122, the elapsed stoppage time Tstop obtained in step S121 and the stoppage time Tth2 calculated in step S119 are compared. When it is determined that Tstop>Tth2, the motor rotation speed reduction control is restarted, and the operation shifts to step S106. Meanwhile, when it is not determined that Tstop>Tth2, the temporary stoppage of the motor rotation speed reduction control is continued, and the operation shifts to step S123.

The temperature information TMinv of the inverter 40 is acquired from the inverter temperature sensors 43a and 43b in step S123, and the operation shifts to step S124.

In step S124, the temperature information TMinv of the inverter 40 obtained in step S123 and a predetermined threshold TMth2, lower than the predetermined threshold TMth1, set in advance are compared. When it is determined that TMinv>TMth2, it is determined that the temperatures of the semiconductor switching elements 41a to 41f are not temperatures appropriate to restart the motor rotation speed reduction control, the operation shifts to step S121, and the temporary stoppage of the motor rotation speed reduction control is continued. Meanwhile, when it is not determined that TMinv>TMth2, the temperatures of the semiconductor switching elements 41a to 41f are appropriate, the motor rotation speed reduction control is restarted, and the operation shifts to step S106. When the predetermined threshold TMth1 and predetermined threshold TMth2 are in a relationship of TMth1>TMth2, and the temperatures of the semiconductor switching elements 41a to 41f drop to the predetermined threshold TMth2 or less before the temporary stoppage time elapses, discharge of the secondary smoothing capacitor 50 can be swiftly carried out by restarting the motor rotation speed reduction control.

As heretofore described, a swift discharge of the secondary smoothing capacitor 50 can be carried out by temporarily stopping the motor rotation speed reduction control, thereby raising the inter-terminal voltage of the secondary smoothing capacitor 50, and controlling until the rotation speed of the 3-phase alternating current motor 60 is sufficiently low.

Also, voltage applied to the secondary smoothing capacitor 50 can be brought close to an optimal value by the temporary stoppage time of the motor rotation speed reduction control being a predetermined time, and the predetermined time can be determined in accordance with vehicle information including at least one of the temperature of the 3-phase alternating current motor 60 immediately before stopping, the temperature of the inverter 40, the rotation speed of the 3-phase alternating current motor 60, and the inter-terminal voltage of the secondary smoothing capacitor 50.

Also, when the temperature of the inverter 40 exceeds a preset first threshold during execution of the motor rotation speed reduction control, the motor rotation speed reduction control is stopped, and when the temperature of the inverter 40 drops below a preset second threshold lower than the first threshold, or when a predetermined time elapses, the motor rotation speed reduction control is restarted, whereby protection can be implemented before the inverter temperature exceeds a part rating resulting in breakage, and motor rotation stoppage control can be restarted as quickly as possible, and rotation stopped, at a stage at which the temperature drops to a temperature at which motor rotation stoppage control can be implemented.

Also, by the discharge determination instruction unit 73 outputting a discharge stoppage instruction in at least one of a case in which a vehicle collision is detected and a case in which the vehicle power is to be switched to a stopped state, a high voltage charge accumulated in the secondary smoothing capacitor 50 can be swiftly released after the motor rotation speed drops, without losing the power supply for driving the inverter control unit 72.

Discharge control of the primary smoothing capacitor 30 and energy shifting capacitor 23 may be carried out in the converter control unit 71 simultaneously with the discharge of the secondary smoothing capacitor 50. In this case, power is supplied from the inverter control unit back-up power supply 74 to the converter control unit 71 too.

Heretofore, a description has been given of the power conversion system according to the first embodiment of the invention, but the embodiment can be modified or abbreviated as appropriate without departing from the scope of the invention.

Various modifications and alterations of this invention will be apparent to those skilled in the art without departing from the scope and spirit of this invention, and it should be understood that this is not limited to the illustrative embodiments set forth herein.

What is claimed is:

1. A power conversion system, comprising:
    a direct current power supply;
    a step-up converter that steps up direct current voltage supplied from the direct current power supply;
    an inverter that converts direct current voltage output from the step-up converter into alternating current voltage;
    a capacitor that smooths inter-terminal voltage between the step-up converter and inverter;
    an inverter controller supplied with power by inter-terminal voltage of the capacitor;
    a voltage sensor that detects the inter-terminal voltage of the capacitor;
    a motor linked to an axle driven by the inverter;
    a motor rotation speed sensor that detects a rotation speed of the motor; and
    a discharge determination indicator that outputs an instruction to release a charge accumulated in the capacitor, wherein
    execution of a discharge operation is instructed by the discharge determination indicator, a motor rotation speed reduction control that reduces the rotation speed of the motor is carried out by the inverter controller when the rotation speed of the motor is equal to or greater than a preset threshold, and
    when inter-terminal voltage obtained from the voltage sensor drops below a preset threshold during execution of the motor rotation speed reduction control, the motor rotation speed reduction control is stopped, whereby induction voltage caused by motor rotation is applied to the capacitor, and the inter-terminal voltage of the capacitor is raised.

2. The power conversion system according to claim 1, wherein a stoppage time of the motor rotation speed reduction control is a predetermined time.

3. The power conversion system according to claim 2, wherein the predetermined time is determined in accordance with vehicle information including at least one of a temperature of the motor immediately before stopping, a temperature of the inverter, the rotation speed of the motor, and the inter-terminal voltage of the capacitor.

4. The power conversion system according to claim 1, wherein the motor rotation speed reduction control is stopped when a temperature of the inverter exceeds a preset first threshold during execution of the motor rotation speed reduction control, and the motor rotation speed reduction control is restarted when the temperature of the inverter drops below a preset second threshold lower than the first threshold, or when a predetermined time elapses.

5. The power conversion system according to claim 1, wherein the discharge determination indicator outputs a discharge stoppage instruction in at least one of a case in which a vehicle collision is detected and a case in which vehicle power is to be switched to a stopped state.

* * * * *